United States Patent
Huisman et al.

(10) Patent No.: US 6,572,787 B1
(45) Date of Patent: Jun. 3, 2003

(54) EVACUATION OF HYDROGEN AND CARBON MONOXIDE FROM A HYDROCARBONACEOUS FEEDSTOCK

(75) Inventors: Hans Michiel Huisman, Amsterdam (NL); Patrick Dennis Lawrence Mercera, Amsterdam (NL); Coen Willem Johannes Pieterse, Amsterdam (NL); David Schaddenhorst, Amsterdam (NL); Ronald Jan Schoonebeek, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/600,066

(22) PCT Filed: Jan. 19, 1999

(86) PCT No.: PCT/EP99/00324

§ 371 (c)(1),
(2), (4) Date: Jul. 10, 2000

(87) PCT Pub. No.: WO99/37580

PCT Pub. Date: Jul. 29, 1999

(30) Foreign Application Priority Data

Jan. 20, 1998 (EP) .............................................. 98300389

(51) Int. Cl.$^7$ ................................................. C07C 1/04
(52) U.S. Cl. ................................... 252/373; 423/648.1
(58) Field of Search ................................. 502/332, 325, 502/328; 423/648.1, 418.2; 252/373

(56) References Cited

U.S. PATENT DOCUMENTS

| | | | | | |
|---|---|---|---|---|---|
| 4,055,512 | A | * | 10/1977 | Kageyama et al. | 502/243 |
| 4,212,767 | A | * | 7/1980 | Daniel | 502/211 |
| 4,331,451 | A | * | 5/1982 | Isogaya et al. | 252/373 |
| 4,552,861 | A | * | 11/1985 | Courty et al. | 252/373 |
| 4,837,397 | A | * | 6/1989 | Absil et al. | 502/66 |
| 4,952,543 | A | * | 8/1990 | Huang et al. | 208/111.15 |
| 5,149,464 | A | | 9/1992 | Green et al. | |
| 5,486,313 | A | * | 1/1996 | De Jong et al. | 252/372 |
| 5,639,401 | A | * | 6/1997 | Jacobs et al. | 252/373 |
| 5,658,497 | A | * | 8/1997 | Kumar et al. | 252/373 |

FOREIGN PATENT DOCUMENTS

| | | |
|---|---|---|
| EP | 737164 A | 3/1985 |
| EP | 640561 A | 3/1995 |
| WO | 92/11199 | 7/1992 |
| WO | 93/01130 | 1/1993 |
| WO | 96/04200 | 8/1994 |

* cited by examiner

Primary Examiner—Stanley S. Silverman
Assistant Examiner—Edward M. Johnson

(57) ABSTRACT

A catalyst comprising a catalytically active metal, selected from Ru, Rh, Os and Ir, associated with at least one inorganic metal cation or precursor thereof, wherein the inorganic metal cation or precursor thereof is present in intimate association supported on or with the catalytically active metal, a process for the preparation of the catalyst, and a process for the preparation of carbon monoxide and/or hydrogen from a hydrocarbonaceous feedstock using the catalyst.

19 Claims, No Drawings

EVACUATION OF HYDROGEN AND CARBON MONOXIDE FROM A HYDROCARBONACEOUS FEEDSTOCK

The present invention relates to a catalyst suitable for the preparation of carbon monoxide and/or hydrogen from a gaseous or liquid hydrocarbonaceous feedstock, a process for the preparation of such a catalyst, and a catalytic partial oxidation process using such a catalyst.

The partial oxidation of hydrocarbons, for example methane or natural gas, in the presence of a catalyst is an attractive route for the preparation of synthesis gas. The partial oxidation of a hydrocarbon is an exothermic reaction and, in the case in which methane is the hydrocarbon, proceeds by the following reaction:

$$2CH_4 + O_2 \rightarrow 2CO + 4H_2$$

The optimum catalytic partial oxidation process for application on a commercial scale would give high yields of carbon monoxide and hydrogen at elevated pressures, for example about 30 bar, and high space velocities, for example of the order of 1,000,000 Nl/kg/h or more. For thermodynamic reasons, in order to obtain high yields of carbon monoxide and hydrogen under these process conditions, it is necessary to operate the partial oxidation process at high temperatures.

The literature contains a number of documents disclosing details of experiments conducted into the catalytic oxidation of hydrocarbons, in particular methane, employing a wide range of catalysts. Reference is made for instance to U.S. Pat. No. 5,149,464, WO 92/11199, and WO 93/01130. The majority of these experiments, however, have been conducted under relatively mild conditions or under conditions unsuited to the operation of a large, commercial catalytic partial oxidation process.

The literature, moreover, contains a number of documents disclosing details of experiments conducted into the catalytic partial oxidation of hydrocarbons under conditions required for commercial operation to produce mixtures of carbon monoxide and/or hydrogen.

In EP-A-640561 is disclosed that the catalytic partial oxidation process may be operated under conditions demanded of commercial processes, in high yield and with low deactivation by employing a catalyst comprising a Group VIII catalytically active metal supported on a refractory oxide having at least two cations selected from Groups IA, IIA, IIIA and IVA of the Periodic Table or the transition metals.

Moreover, in EP-A-737164 is disclosed that, when operated under the conditions of elevated pressure and at high temperature as demanded by a commercial process, the catalytic partial oxidation of hydrocarbons can, in the presence of nitrogen, yield a synthesis gas product containing a number of by-products, in particular ammonia ($NH_3$) and hydrogen cyanide (HCN), in low but significant amounts. It has been found that such by-products can adversely affect downstream processes to convert the carbon monoxide and/or hydrogen produced by the catalytic partial oxidation process, e.g. in the case of Fischer-Tropsch synthesis or of the synthesis of methanol. The presence of by-products, in particular ammonia or hydrogen cyanide, in the products of the catalytic partial oxidation process is thus undesirable. In EP-A-737164 is disclosed that the generation of such by-products is significantly lower in a process employing a catalyst comprising rhodium, iridium or platinum as catalytically active metal. At such levels it is possible to remove any undesired by-products, using known solvent, absorption processes and the like. Alpha-alumina is employed as the catalyst support.

In WO 96/04200 is disclosed a catalytic partial oxidation process which employs a Group VIII catalytically active metal supported on a zirconia-based carrier, which is found to have a high thermal-shock resistance.

In EP 548 679 is disclosed a catalytic partial oxidation process wherein a catalyst containing ruthenium and/or rhodium as an active ingredient and cobalt and/or manganese as a promoter is used.

Accordingly, it will be apparent that there are a number of conditions and circumstances which affect the performance of a catalytic partial oxidation reaction, and that whilst it is possible to optimize in terms of individual performance parameters, there is some conflict between individual optimizations, each directed specifically to one of the above performance parameters, whereby it is not possible to operate a process with simultaneous optimization of all conditions. Specifically, nitrogen is present in many natural gas feedstocks, and the preparation of pure, nitrogen-free oxygen on a commercial scale is both very expensive and technically difficult. Therefore the process must produce acceptably low levels of N-containing by-product. Moreover, the choice of catalytically active metal, refractory oxide and the like in the catalyst to be effective on a commercial scale must be made bearing in mind factors including high temperature and pressure resistance and thermal-shock resistane under the extreme conditions to be employed in terms of the factors hereinbefore mentioned. Finally, the process must produce optimum yields and selectivity to desired products and optimum lifetime under such extreme conditions, and indeed under varying conditions which may prevail in the event of fluctuations in operation.

Accordingly, there is a need for a process for the catalytic partial oxidation of hydrocarbons in which nitrogen may be present during the partial oxidation reactions, which may be applied on a commercial scale to produce a product of carbon monoxide and/or hydrogen in high yield and selectivity, containing a minimum of components such as ammonia and hydrogen cyanide, and at low or negligible catalyst deactivation rates.

Surprisingly, it has been found that, by employing in the catalytic partial oxidation process a catalyst comprising the catalytically active metal associated with a performance modifying cation selected.from Al, Mg, Zr, Ti, La, Hf, and Si, the above objects may be achieved in admirable manner, for a wide range of operating conditions. Moreover, selection of cation employed may be made for optimization of specific performance factors, including feedstock conversion and product yield, catalyst stability, coke formation, top temperature control and the like.

Accordingly, the present invention provides a catalyst comprising a catalytically active metal, selected from Ru, Rh, Os and Ir, associated with a metal cation selected from Al, Mg, Zr, Ti, La, Hf, and Si supported on a carrier, obtainable by a process comprising providing the metal cation and the catalytically active metal in solutions adapted for impregnation or co-impregnation on the carrier, drying, and optionally calcining.

The inorganic metal cation is selected from Al, Mg, Zr, Ti, La, Hf, and Si, of which Zr is preferred. The cation is preferably in the form of its oxide.

The catalyst is supported on a carrier, for example comprising a refractory oxide having at least one cation, or comprising a metal or other attrition resistant, high temperature resistant substrate.

Preferably, the catalyst comprises cation to metal in an atomic ratio in excess of or equal to 1.0 at its surface, more preferably in excess of or equal to 2.0, even more preferably in excess of or equal to 3.0 up to a maximum only limited by the constraints of the method for constructing the catalyst, e.g. impregnation.

It is a particular advantage of the catalyst of the present invention that the nature of association of the catalytically active metal and the metal cation would seem to be at least partially self-regulating or directing. Without being limited to this theory it would seem that a form of feedstock conditioning by the metal cation serves to optimize catalytic activity and thereby generate enhancement in the performance parameters of yield, selectivity, deactivation resistance and low by-product formation simultaneously.

The catalytically active metal is selected from ruthenium, rhodium, osmium and iridium, preferably from rhodium and iridium. As has been discussed hereinbefore, these metals offer the significant advantage that substantially lower amounts of ammonia and hydrogen cyanide are produced during the catalytic partial oxidation reaction, compared with the other metals from Group VIII of the Periodic Table of the Elements.

The catalyst may comprise the catalytically active metal in any suitable amount to achieve the required level of activity. Typically, the catalyst comprises the active metal in an amount in the range of from 0.01 to 20% by weight, preferably from 0.02 to 10% by weight, more preferably from 0.1 to 7.5% by weight.

The catalyst may comprise the metal cation in any suitable amount to achieve the required level of selectivity and conversion and deactivation resistance. Typically the catalyst comprises the metal cation in an amount of at least 0.5 weight %. The cation is preferably present in the catalyst in a range of from 1.5–15.0 weight %, most preferably 5.0 to 15.0 weight %.

The catalytically active metal is supported on a carrier. Suitable carrier materials are well known in the art and include the refractory oxides, such as silica, alumina, titania, zirconia and mixtures thereof. Mixed refractory oxides, that is refractory oxides comprising at least two cations may also be employed as carrier materials for the catalyst. Most suitable refractory oxide carriers are binary oxides of zirconia and alumina, in particular in (partially) stabilised form such as ZTA (zirconia toughened alumina) or PSZ (partially stabilised zirconia), mullite or alumina. Also metals or metal alloys, for example fecralloy-type alloys, preferably in the form of gauzes, can be suitably applied as carrier material.

A suitable technique for associating the metal and metal cation is impregnation, in the case that the metal and cation are supported on a carrier as hereinbefore is defined. Preferably, the carrier is impregnated with a solution of a compound of the catalytically active metal and a solution of a salt of the metal cation, followed by drying and, optionally, calcining the resulting material. The solutions are preferably combined in suitable amount and co-impregnated. Alternatively impregnation may be sequential, with the first stage impregnation, drying and, optionally, calcining with the catalytically active metal solution, and second stage impregnation, drying and, optionally, calcining with the metal cation solution or a mixture thereof with the catalytically active metal solution.

Preferred techniques for impregnation are by dipping, painting, spraying, immersing, applying by measured droplet and the like of a suspension or solution of the modifying cation, with subsequent drying in hot air or the like and calcining, in manner that a uniform impregnation is achieved. Preferably, impregnation and/or drying is carried out in the absence of distorting gravitation, meniscus or capillary effects during drying, which might provide an undesired gradient or total content of the impregnated cation. For example, the oxide support may be rotated or suspended in manner that contact with any other objects does not encourage meniscus or capillary effects.

Accordingly, in a further aspect of the invention there is provided a process for the preparation of a catalyst adapted to catalyze a partial oxidation reaction, the catalyst comprising a catalytically active metal, selected from Ru, Rh, Os and Ir, associated with a metal cation selected from Al, Mg, Zr, Ti, La, Hf, and Si supported on a carrier, the process comprising providing the metal cation and the catalytically active metal in solutions adapted for impregnation or co-impregnation on the carrier, drying, and optionally calcining.

In a further aspect of the invention there is provided a process for the preparation of carbon monoxide and/or hydrogen from a hydrocarbonaceous feedstock, which process comprises contacting a mixture of the feedstock and an oxygen-containing gas with a catalyst comprising a catalytically active metal, selected from Ru, Rh, Os and Ir, associated with a metal cation selected from Al, Mg, Zr, Ti, La, Hf, and Si supported on a carrier, obtainable by a process comprising providing the metal cation and the catalytically active metal in solutions adapted for impregnation or co-impregnation on the carrier, drying, and optionally calcining.

The process of the present invention may be used to prepare carbon monoxide and/or hydrogen from any hydrocarbonaceous feedstock that is gaseous under the conditions prevailing during the partial oxidation reaction. The feedstock may contain compounds that are liquid and/or compounds that are gaseous under standard conditions of temperature and pressure (i.e. at 0° C. and 1 atm.). The process is particularly suitable for the conversion of methane, natural gas, associated gas or other sources of light hydrocarbons. In this respect, the term "light hydrocarbons" is a reference to hydrocarbons having from 1 to 5 carbon atoms. The process may be applied in the conversion of naturally occurring reserves of methane which contain a substantial amount of carbon dioxide. The feed preferably comprises methane in an amount of at least 50% by volume, more preferably at least 75% by volume, especially at least 80% by volume. The process is also particularly suitable for the conversion of liquid hydrocarbon feedstocks such as naphtha feedstocks boiling between 35° C. and 150° C., kerosene feedstocks boiling between 150° C. and 200° C., synthetic gas oil feedstocks boiling between 200° C. and 500° C., in particular between 200° C. and 300° C.

It is possible to have hydrocarbonaceous material present in the feedstocks to be used in the process according to the present invention which are gaseous under standard conditions of temperature and pressure, together with material which are liquid under standard conditions of temperature and pressure. Hydrocarbons which are liquid under standard conditions of temperature and pressure typically contain up to 25 carbon atoms in their molecules.

The process according to the present invention can also be carried out when the feedstock contains oxygenates (being gaseous and/or being liquid under standard condition of temperature and pressure). Oxygenates to be used as (part of) the feedstock in the process according to the present invention are defined as molecules containing apart from carbon and hydrogen atoms at least 1 oxygen atom which is linked to either one or two carbon atoms or to a carbon atom and a hydrogen atom. Examples of suitable oxygenates comprise methanol, ethanol, dimethyl ether and alkanols, ether, acids and esters having up to 25 carbon atoms.

Also mixtures of hydrocarbons and oxygenates as defined hereinbefore can be used as feedstock in the process according to the present invention.

The hydrocarbonaceous feedstock is contacted with an oxygen-containing gas during the partial oxidation process. Air may be used as the oxygen-containing gas, in which case nitrogen will be present in the feed and reaction mixture in large quantities. Alternatively, substantially pure oxygen or oxygen-enriched air may be used.

Preferably, the feed comprises the hydrocarbonaceous feedstock and oxygen in amounts giving an oxygen-to-carbon ratio in the range of from 0.3 to 0.8, preferably from 0.45 to 0.75. References to the oxygen-to-carbon ratio refer to the ratio of oxygen in the form of molecules ($O_2$) to carbon atoms present in the hydrocarbon feedstock. Oxygen-to-carbon ratios of the stoichiometric ratio, 0.5, that is in the range of from 0.45 to 0.65, are particularly suitable.

If oxygenate feedstocks are used, e.g. methanol, oxygen-to-carbon ratios below 0.3 can suitably be used.

The feed may optionally comprise steam. If steam is present in the feed, the steam-to-carbon ratio (that is the ratio of molecules of steam ($H_2O$) to carbon atoms in the hydrocarbon) is preferably in the range of from above 0.0 to 3.0, more preferably from above 0.0 to 2.0.

The process of the present invention is operated at elevated pressures, that is pressures significantly above atmospheric pressure. The process is typically operated at pressures in the range of up to 150 bara. Preferably, the operating pressure is in the range of from 2 to 125 bara, more preferably from 5 to 100 bara.

The process may be operated at any suitable temperature. Under the preferred conditions of high pressure prevailing in the process, the feed gases are typically allowed to contact the catalyst at elevated temperatures in order to achieve the level of conversion required for a commercial scale operation. Accordingly, the process is typically operated at a temperature of at least 750° C. Preferably, the operating temperature is in the range of from 800 to 1300° C., more preferably in the range of from 900 to 1200° C. Temperatures in the range of from 1000 to 1200° C. are particularly suitable with substantially pure oxygen, or in the range of from 800° C. to 1000° C. with air. Reference herein to temperature is to the temperature of the gas leaving the catalyst.

The feed mixture is typically provided during the catalytic partial oxidation process at gas space velocities (expressed as normal leters (i.e. leters at 0° C. and 1 atm.) of gas per kilogram of catalyst per hour) in the range of from 20,000 to 100,000,000 Nl/kg/h, preferably in the range of from 50,000 to 50,000,000 Nl/kg/h. Space velocities in the range of from 500,000 to 30,000,000 Nl/kg/h are particularly suitable.

The gaseous mixture of the hydrocarbonaceous feedstock and the oxygen-containing gas is preferably contacted with the catalyst under adiabatic conditions. For the purposes of this specification, the term "adiabatic" is a reference to reaction conditions in which substantially all heat loss and radiation from the reaction zone is prevented, with the exception of heat leaving in the gaseous effluent stream of the reactor.

Any suitable reaction regime may be applied in the process of the present invention in order to contact the reactants with the catalyst. One suitable regime is a fluidized bed, in which the catalyst is employed in the form of particles fluidized by a stream of gas. A preferred reaction regime for use in the process is a fixed bed reaction regime, in which the catalyst is retained within a reaction zone in a fixed arrangement. Particles of catalyst may be employed in the fixed bed regime, retained using fixed bed reaction techniques well known in the art. Alternatively, the fixed arrangement may comprise the catalyst in the form of a monolithic structure. A most preferred monolithic structure comprises a ceramic foam. Suitable ceramic foams for use in the process are available commercially. Further, alternative forms for the catalyst include refractory oxide honeycomb monolith structures or metal gauze structures.

A mixture of carbon monoxide and hydrogen prepared by the process of this invention is particularly suitable for use in the synthesis of hydrocarbons, for example by means of the Fisher-Tropsch synthesis, or the synthesis of oxygenates, for example methanol. Processes for the conversion of the mixture of carbon monoxide and hydrogen into such products are well known in the art.

Hydrogen or a mixture with other gases, prepared by the process of this invention may be particularly suitable for use as a combustible fuel either directly or indirectly.

The process of this invention could very suitably be used to provide the hydrogen feed for a fuel cell. In fuel cells, hydrogen and oxygen are passed over the fuel cell in order to produce electricity and water. Fuel cell technology is well known in the art.

The present invention is further described by way of the following illustrative examples.

EXAMPLE 1

Catalyst Preparation—not According to the Invention 1600 pp $cm^{-2}$ (pores per $cm^2$) ceramic foam was cut to size to fit into the reactor or was crushed and sieved to 30/80 mesh particles before placing in an oven at 120° C. over night. Foam (particles) was weighed and the amount of rhodium or iridium chloride solution needed to give a 5 wt % rhodium or iridium loading was calculated. The solution was added to the foam (particles) to impregnate them in three steps and the foam (particles) were dried in an oven at 140° C. in between each impregnation. This was repeated until all the necessary amount of solution was added. After this the foam (particles) were dried and calcined in air as follows: 4 hours at 120° C., temperature raised to 700° C. with 80° C./hour, 4 hours at 700° C. and cool-down to 120° C.

The resulting catalysts comprised 5.0 weight % of iridium or rhodium on PSZ (partially-stabilised zirconia), ZTA (zirconia-toughened alumina), alumina or mullite foam. The results are given in Table 1.

EXAMPLE 2

Catalyst Preparation—According to the Invention

The procedure of Example 1 was followed with the exception that the impregnating solution was modified by addition of a solution of a salt of an inorganic cation calculated to give a 5 weight % loading of the inorganic cations. Solutions were selected from zirconyl nitrate, Mg nitrate, Al nitrate, and their mixtures.

The resulting catalysts comprised 5.0% by weight iridium or rhodium and 5% by weight of cations of Zr, Mg, Al, or Mg—Al, co-impregnated on 1600 $ppcm^{-2}$ PSZ, ZTA, alumina, or mullite foam. The results are given in Table 2.

EXAMPLE 3

Catalyst Preparation—According to the Invention

The procedure of Example 1 was followed with the additional stage of a second impregnation using a solution of a salt of an inorganic metal cation calculated to give a 5 weight % loading of the inorganic metal cation. The second impregnation was carried out using the same procedure of Example 1 for the first impregnation. The resulting impregnated foam (particles) were calcined using the procedure of Example 1.

The resulting catalysts comprised 5.0% by weight Ir or Rh and 5% by weight of cations of Zr, sequentially impregnated on alumina or Y-PSZ foam.

The results are given in Table 3.

TABLE 1

| Catalyst | Foam | Group VIII Metal | Metal Cation |
| --- | --- | --- | --- |
| 1a | Y-PSZ | Ir | — |
| 1b | Alumina | Ir | — |
| 1c | Y-PSZ | Rh | — |
| 1d | Ce-ZTA | Ir | — |
| 1e | ZTA | Ir | — |
| 1f | Zr-mullite | Ir | — |

TABLE 2

| Catalyst | Foam | Group VIII Metal | Metal Cation |
| --- | --- | --- | --- |
| 2a | Y-PSZ | Ir | Zr co-impreg |
| 2b | Y-PSZ | Ir | Mg co-impreg |
| 2c | Y-PSZ | Ir | Al co-impreg |
| 2d | Y-PSZ | Ir | MgAl co-impreg |
| 2e | Y-PSZ | Rh | Zr co-impreg |
| 2f | Alumina | Ir | Zr co-impreg |
| 2g | Ce-ZTA | Ir | Zr co-impreg |
| 2h | ZTA | Ir | Zr co-impreg |
| 2I | mullite | Ir | Zr co-impreg |

TABLE 3

| Catalyst | Foam | Group VIII Metal | Metal Cation |
| --- | --- | --- | --- |
| 3a | Alumina | Ir | Zr seq. impreg |
| 3b | Y-PSZ | Ir | Zr seq. impreg |

EXAMPLE 4

Catalytic Partial Oxidation

A reactor was constructed comprising a transparent sapphire or metal tube. The modified catalyst prepared as hereinbefore described was loaded into the tube and retained in the form of a fixed bed of catalyst. Methane and air or oxygen-enriched air ($O_2:N_2$ is 1.8 v/v), in sufficient amounts to give an oxygen-to-carbon ratio in the range of from 0.49 to 0.64, were thoroughly mixed just before being introduced into the reactor to contact the fixed bed of catalyst. The mixture of methane and air or oxygen-enriched air was fed to the reactor at a pressure of 11 bara and at a gas hourly space velocity (GHSV) in the range of from 2,500,000 to 3,600,000 Nl/kg/h.

The composition of the gas mixture leaving the reactor was determined by gas chromatography and weighing water condensed from the gas stream leaving the reactor.

In Tables 4 to 7 are given the results as $xCH_4$ (% methane conversion), sCO, and $sH_2$ (selectivity to CO and $H_2$)

TABLE 4

Enriched-air CPO: Performance of Ir/Y-PSZ with metal cation (GHSV is 3,300,000 Nl/kg/h; $O_2:C$ is 0.55)

| Catalyst | $xCH_4$ % | sCO % | $sH_2$ % | $NH_3$ make ppmv |
| --- | --- | --- | --- | --- |
| 1a | 88 | 95 | 88 | 0.5 |
| 2a | 91 | 95 | 90 | 0.5 |
| 2b | 92 | 95 | 91 | 0.8 |
| 2c | 92 | 95 | 91 | 1.1 |
| 2d | 92 | 95 | 93 | 1.0 |
| Thermo[a] | 93 | 95 | 93 | 230 |

[a]Performance at thermodynamic equilibrium

TABLE 5

Enriched-air-CPC: Effect of modifier on Ir/Y-PSZ (GHSV is 3,400,000 Nl/kg/h; $O_2:C$ is 0.63)

| Catalyst | $xCH_4$ % | sCO % | $sH_2$ % | $NH_3$ make ppmv | Deact.[b] %/24 hour |
| --- | --- | --- | --- | --- | --- |
| 1a | 98 | 95 | 88 | 1.6 | 3 |
| 2a | 99 | 95 | 88 | 2.1 | 0.5 |
| Thermo | 99.7 | 95 | 89 | 113 | |

[b]Decline in $xCH_4$ per 24h

The results presented in Table 4 and 5 indicate that the modifiers have a beneficial influence on the $CH_4$ conversion. The important parameters of the catalyst performance are: a high $CH_4$ conversion, a low $NH_3$ make and a high stability. The stability is expressed as the decrease in $CH_4$ conversion as function of time. The zirconia modifier appeared to be most beneficial: the $CH_4$ conversion of this catalyst was the highest while at the same time the $NH_3$ make was not much increased. This catalyst was tested for its stability and it appeared higher than the stability of the catalyst without modifier.

The Zr modification of CPO catalysts is not only beneficial for the Y-PSZ supported catalysts. An even stronger effect is observed with an alumina support. The Ir/alumina catalyst was not active in the enriched-air-CPO experiment, while the Zr-modified Ir/alumina showed an excellent performance. A high and stable $CH_4$ conversion was measured (see Table 6).

TABLE 6

Enriched-air-CPO: Performance of Ir/alumina (alumina: Dytech Poral 20; GHSV is 4,900,000 Nl/kg/h; $O_2:C$ is 0.63)

| Catalyst | $XCH_4$ % | SCO % | $SH_2$ % | Deact. %/24 hour |
| --- | --- | --- | --- | --- |
| 1b | | | No reaction | |
| 2f | 99 | 95 | 88 | 0.6 |
| 3a | 99 | 95 | 89 | 1.8 |
| Thermo | 99.4 | 95 | 90 | |

Of interest are the air-CPO experiments. It appeared that also under these conditions the Zr modification shows its benefits. Catalysts have been prepared with differing active phases and different supports and the results show an improved performance of most systems when the Zr modification is applied (see Table 7). Zr-modified catalysts show a higher $CH_4$ conversion, whilst the $NH_3$ make is not much increased.

In Table 7, 1a, and 1c–1f represent catalysts not according to the invention, given for comparative purpose with corresponding catalysts according to the invention.

In the process using catalyst 3b, prepared by impregnating a solution of zirconia on Ir/Y-PSZ, the presence of zirconia improves the performance of the catalyst, without changing the Ir dispersion. However, the catalyst prepared in this way is not as good as the catalyst in which the Ir and Zr are mixed in the impregnation solution.

TABLE 7

Air-CPO: Effect of Zr on different supports (GHSV is 3,400,000 Nl/kg/h; $O_2$:C is 0.49)

| Catalyst | $xCH_4$ % | sCO % | $sH_2$ % |
|---|---|---|---|
| 1c (comp) | 64 | 88 | 79 |
| 2e | 75 | 90 | 88 |
| 1a (comp) | 65 | 88 | 80 |
| 2a | 74 | 90 | 88 |
| 3b | 68 | 88 | 80 |
| 1d (comp) | 63 | 87 | 79 |
| 2g | 75 | 90 | 88 |
| 1e (comp) | 60 | 85 | 75 |
| 2h | 74 | 90 | 86 |
| 1f (comp) | 70 | 89 | 85 |
| 2I | 72 | 89 | 85 |
| Thermo | 74 | 90 | 90 |

What is claimed is:

1. A process for the preparation of carbon monoxide and hydrogen from a hydrocarbonaceous feedstock, which process comprises contacting a mixture of the feedstock and an oxygen-containing gas with a catalyst comprising a catalytically active metal, selected from the group consisting of Ru, Rh, Os and Ir, associated with a metal cation selected from the group consisting of Al, Mg, Zr, Ti, La, Hf, and Si supported on a carrier, said catalyst prepared by a process comprising:

providing the metal cation and the catalytically active metal in solutions adapted for impregnation or co-impregnation on the carrier;

drying; and, optionally calcining;

wherein the mixture is contacted with the catalyst at a temperature of at least about 750° C., at a pressure of up to about 150 bara, and at a gas hourly space velocity in the range of from about 20,000 Nl/kg/h to about 100,000,000 Nl/kg/h.

2. The process of claim 1 in which the mixture is contacted with the catalyst at a temperature of at least about 750° C., at a pressure of up to about 150 bara, and at a gas hourly space velocity in the range of from about 20,000 Nl/kg/h to about 100,000,000 Nl/kg/h.

3. The process of claim 1 in which the mixture has an oxygen-to-carbon ratio in the range of from about 0.3 to about 0.8.

4. The process of claim 1 in which the mixture is contacted with the catalyst under substantially adiabatic conditions.

5. The process of claim 1, in which the temperature is in the range of from about 900° C. to about 1200° C., the pressure is in the range of from about 5 bara to about 100 bara and the gas hourly space velocity is in the range of from about 500,000 Nl/kg/h to about 30,000,000 Nl/kg/h.

6. The process of claim 5, in which the hydrocarbonaceous feedstock comprises methane in an amount of at least 50% by volume.

7. The process of claim 5, further comprising feeding the hydrogen into a fuel cell.

8. The process of claim 5, further comprising synthesizing hydrocarbons from a reaction mixture comprising the carbon monoxide and the hydrogen.

9. The process of claim 5, further comprising synthesizing oxygenates from a reaction mixture comprising the carbon monoxide and the hydrogen.

10. The process of claim 1, in which the hydrocarbonaceous feedstock comprises hydrocarbons having from 1 to 5 carbon atoms.

11. The process of claim 1, in which the hydrocarbonaceous feedstock comprises methane in an amount of at least 50% by volume.

12. The process of claim 1, in which the hydrocarbonaceous feedstock comprises naphtha feedstocks boiling between about 35° C. and about 150° C.

13. The process of claim 1, in which the hydrocarbonaceous feedstock comprises kerosene feedstocks boiling between about 150° C. and about 200° C.

14. The process of claim 1, in which the hydrocarbonaceous feedstock comprises synthetic gas oil feedstocks boiling between about 200° C. and about 300° C.

15. The process of claim 1, in which the process is performed in a fluidized bed.

16. The process of claim 1, in which the process is performed in a fixed bed.

17. The process of claim 16, in which the fixed bed comprises the catalyst in a form selected from the group consisting of a monolithic structure, a refractory oxide honeycomb monolith structure and a metal gauze.

18. The process of claim 16, in which the fixed bed comprises the catalyst in the form of a monolithic structure.

19. The process of claim 18, in which the monolithic structure is a ceramic foam.

* * * * *